United States Patent

Brinson

[11] Patent Number: 6,117,003
[45] Date of Patent: Sep. 12, 2000

[54] METAL DETECTION ASSEMBLY FOR SAUSAGE FILLING HORN

[75] Inventor: Edward P. Brinson, Cary, N.C.

[73] Assignee: Delaware Capital Formation, Inc., Apex, N.C.

[21] Appl. No.: 09/272,639

[22] Filed: Mar. 18, 1999

Related U.S. Application Data

[60] Provisional application No. 60/078,454, Mar. 18, 1998.

[51] Int. Cl.[7] .................................................. A22C 11/02
[52] U.S. Cl. .................................. 452/31; 452/30; 452/49
[58] Field of Search .................................. 452/31, 30, 32, 452/49

[56] References Cited

U.S. PATENT DOCUMENTS

| | | |
|---|---|---|
| 4,023,238 | 5/1977 | Phares . |
| 4,142,273 | 3/1979 | Gay . |
| 4,675,945 | 6/1987 | Evans et al. . |
| 4,766,713 | 8/1988 | Evans . |
| 4,893,377 | 1/1990 | Evans et al. . |
| 4,955,109 | 9/1990 | Evans et al. . |
| 5,173,075 | 12/1992 | Wadell ...................................... 452/49 |
| 5,466,184 | 11/1995 | May . |
| 5,816,903 | 10/1998 | Idziak ....................................... 452/49 |
| 5,857,902 | 1/1999 | Becker et al. ............................ 452/49 |

*Primary Examiner*—Willis Little
*Attorney, Agent, or Firm*—Banner & Witcoff, Ltd.

[57] ABSTRACT

A metal detector is incorporated in a discharge horn of a product filling machine in a manner which shortens the length of the horn to thereby prevent the formation of aesthetically displeasing product due to extended transport of the comminuted product through a filling horn and metal detection equipment.

1 Claim, 1 Drawing Sheet

METAL DETECTION ASSEMBLY FOR SAUSAGE FILLING HORN

This application claims benefit of Provisional Application Ser. No. 60/078,454, filed Mar. 18, 1998.

BACKGROUND OF THE INVENTION

This invention relates to a sausage filing horn capable of detecting shards or pieces of metal in a comminuted product fed through a filing horn or tube of a product packaging machine.

Filing of rucked casing discharged from a filing horn with a comminuted product is typically effected by discharging the product through the filing horn into a casing which is released from the end of the horn in a controlled manner by a braking mechanism. The filled casing is subsequently sealed or clipped and closed in incremental links in order to provide predefined unit lengths or links of product. For example, sausage discharged through a filing horn into casing, which is sealed at one end by a clip, may be filled and sealed in unit lengths by means of a clipper mechanism which operates as the filled casing is discharged from the filing horn.

During the casing filling operation, it may be desirable to detect and sense unwanted metal particles or shards in the product and, in some fashion, shunt or discard the product contaminated by the metal particles or shards before it is discharged into casing. Standard metal detectors may be installed in a horn extension between the filing horn and the clipping apparatus at one end of the horn to identify contaminated product before the product is discharged into the casing. An apparatus capable of detecting such metal particles is available from Graseby Goring Kerr of Amherst, N.Y., as their Model 426 Pipeline Metal Detection System. When such a detector senses metal particles, the logic of the detector unit shifts a valve in the horn, for example, and diverts a contaminated portion of the product from the main filling horn or pipe into a separate collection vessel.

However, use of a metal detection system and horn extension in the manner described may not be acceptable. That is, when packaging dry sausage in casing material, product definition or appearance, especially along the surface thereof is extremely important. The product must be aesthetically pleasing. One must be able to distinguish meat from fat, particularly on the surface as well as in a cross section cut, in order to provide an appealing product. It has been determined that to maintain aesthetic or appropriate product definition, it is necessary to keep the discharge filling horn or discharge pipe as short as possible. In this manner, the product is subject to less mechanical manipulation with the result that the meat and fat portions thereof do not smear together.

Unfortunately, utilization of a metal detection system of the type described can add several feet of product transport piping to a system. This, in turn, will lead to undesirable appearance of the product, especially in dry sausage and pepperoni applications. Such an appearance is unacceptable. Thus, there has developed a need to develop apparatus and methods to solve this problem.

SUMMARY OF THE INVENTION

Briefly, the present invention comprises a metal detection unit wherein a plastic or nonmetallic metalolic horn segment is substituted as part of the product discharge horn for the product filling machine and a metal detection unit is concentrically positioned about the plastic section. Further, the fibrous casing or film may be appropriately folded or rucked on the plastic tube without interfering with the metal detection assembly. As a further feature, the detection unit is programmed to control means for diverting filled and packaged product. Thus, the main flow through the horn continues until a package is filled. The contaminated package is then diverted and/or the filling machine is stopped, alerting the machine operator that a package is filled with contaminated product and that removal is appropriate. If the product is diverted, the machine could nonetheless be stopped for product inspection. The filling distance through the filling horn is maintained as short in length as possible thus ensuring that product definition is enhanced.

Thus, it is an object of the invention to provide an improved filling horn construction having an integral metal detector.

It is a further object of the invention to provide a filling horn construction that has limited length, yet incorporates means for detecting undesirable metal particles in the product which is being filled into casing.

Yet a further object of the invention is to provide an improved product filling construction, and more particularly, a filling horn, which is constructed in part of a plastic tube having a diameter substantially the same as the diameter of the filling horn and further including a metal detection unit concentric therewith.

Another object of the invention is to provide a horn capable of detection of metal products in the product being filled into casing and which is easy to use, easily adjusted, mechanically easy to set up and maintain, and economical.

These and other objects, advantages and features of the invention will be set forth in the detailed description as follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
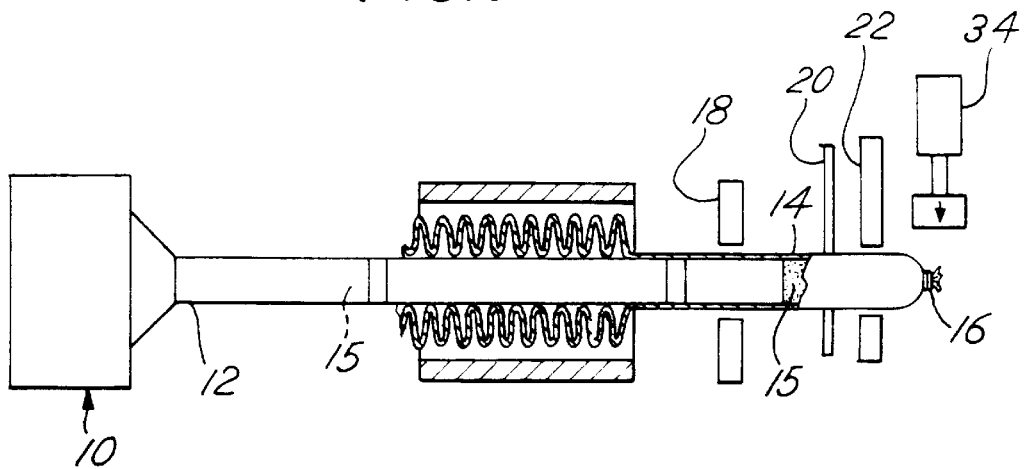
FIG. 1 is a side elevation of a product filling and packaging machine and more particularly, the filling horn associated therewith for filling and subsequently clipping or sealing casing containing product.

FIG. 1 depicts a side elevation of a product filling and packaging machine modified to incorporate a metal detection system of the present invention. Specifically, a product 15, such as a comminuted sausage meat mix is fed from a product pumping apparatus 10 through a horn 12 affixed to the apparatus 10 for discharge into casing 14 which has been rucked on the horn 12. The casing 14 is typically sealed at its open end by a metal clip, for example, clip 16. A unit length of casing 14 is filled with the comminuted product 15. The casing 14 is released from the horn 12 as it is filled, the release being controlled by means of a casing brake 18. Upon filling the unit length of casing 14, gathering arms and voider plates 20 constrict the casing 14 discharged from the end of horn 12. A clipper mechanism 22 then clips or closes and seals the casing 14 to form the product link. Apparatus of this nature are disclosed in prior art patents, such as U.S. Pat. No. 4,142,273 and U.S. Pat. No. 4,675,945, which are incorporated herewith by reference. The particular type of filling packaging machine is however not a limiting feature of the invention, nor is the particular type of filling horn a limiting feature of the invention.

The invention relates to the filling horn 12 which is modified to incorporate the invention and further, the invention includes a metal detection apparatus with various types of controls associated therewith for sensing the filling contents and controlling the continued filling of casing 14 as well as controlling the continued discharge of product 15 through horn 12 into casing 14.

Figure 2:
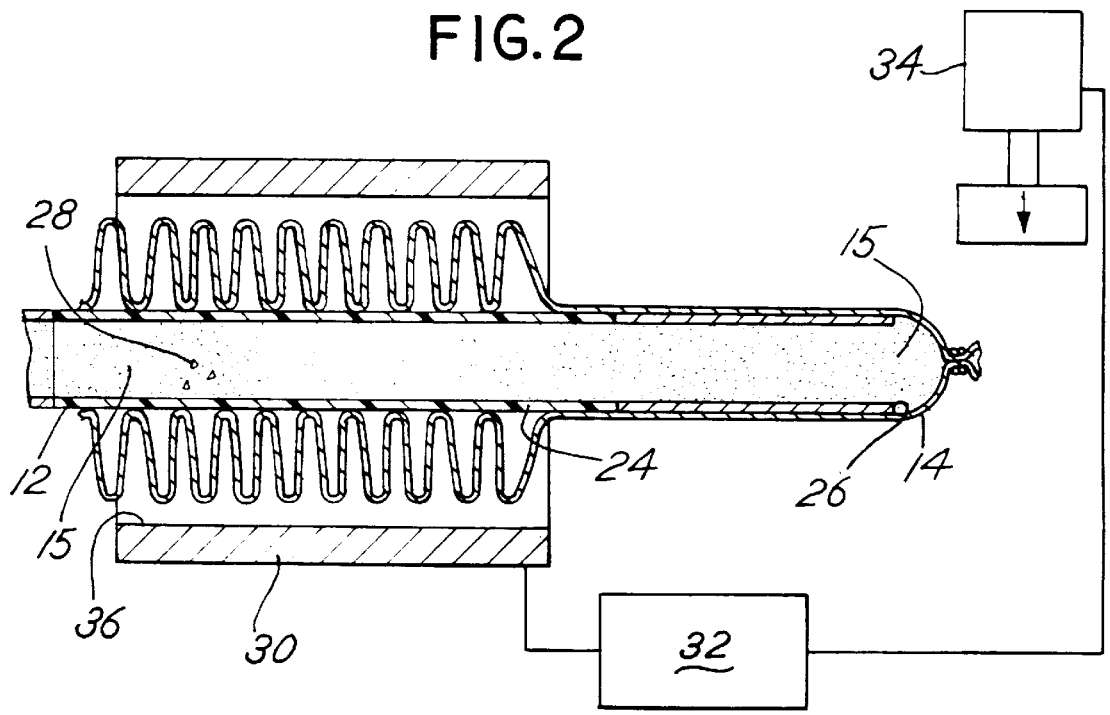
FIG. 2 is a enlarged side elevation of the metal detection section of the apparatus of FIG. 1.

Thus, FIG. 2, depicts an enlarged side elevation of a portion of FIG. 1 and more particularly, horn 12. The horn 12 is typically fashioned from a stainless steel tube. The present invention replaces a portion of horn or tube 12 with a plastic tube 24 of uniform diameter, thickness and shape with respect to the horn 12. The discharge end 26 of horn 12 is a stainless steel extension of the plastic tubular member 24. In the event that metal particles or shards 28 are encapsulated in the stream of comminuted product 15, a metal detection unit 30, which is fitted around and concentric with the plastic tube 24, through various measurement techniques, such as impedance measurement, will detect the metal particles 28. Upon such detection, a signal will be provided to a controller 32. The controller 32, in turn, will initiate any one of a number of operations. The controller 32 may send a signal to a product discharge arm 34, which is activated when the contamination filled casing 14 travels to a discharge station. In this manner, the contaminated product will be discharged to a waste bin by a signal transmitted from controller 32 to the arm 34. Note that the detector unit 30 defines an annular space around the tube 24 so that casing 14 may move through the annular space between the horn 15 and detector unit 30.

As a first alternative, the contaminated product may be diverted from the end 26 of the tube 24 or, alternatively, the filling operation may be stopped until the contaminated material is cleaned or removed from the system. Any one of these options can be effected by signals derived from the controller 32. It is to be noted that the metal detector assembly or unit 30 is arranged concentrically about the plastic tube 24. Further, the detection unit 30 includes an internal wall or cavity 36, which provides an annular space between the tube 26 and the detector 30 into which rucked casing 14 may be positioned for removal from the horn assembly.

It is possible to vary the construction discussed. Thus, the invention is limited only by the following claims and equivalents thereof.

What is claimed is:

1. A product filling apparatus comprising, in combination:
   a product discharge horn including a segmented, generally cylindrical tube having intermediate plastic tube section;
   a metal detector having a passage concentric with the horn and defining an annular space between the plastic tube section and the detector for receipt of rucked casing material;
   a sensor associated with the detector for sensing contaminate metal particles in the product in the horn;
   a controller for responding to contaminate signals from the sensor; and
   means for discharging contaminated product from the horn discriminately in response to the controller.

* * * * *